3,136,816
1-(LOWER ALKYLMERCAPTO-CHLORO-
PHENYL)BIGUANIDES
Royal A. Cutler, Sand Lake, and Samuel Schalit, Albany,
N.Y., assignors to Sterling Drug Inc., New York, N.Y.,
a corporation of Delaware
No Drawing. Original application Mar. 14, 1960, Ser.
No. 14,551. Divided and this application Oct. 24,
1960, Ser. No. 69,789
10 Claims. (Cl. 260—565)

This invention relates to disubstituted 1,3,5-triazines. More particularly, this invention relates to certain new 2-(amino or hydroxy)-4-arylamino-1,3,5-triazines, to the preparation of said new compounds, and to intermediates for the same.

It is a primary object of the instant invention to provide new compositions of matter having diuretic properties and useful as diuretic agents.

The new compounds of the instant invention are (a) 2-($H_2N$—)-4-(Y—NH—)-6-(H—)-1,3,5-triazines, where Y is a member of the group consisting of lower alkylmercaptophenyl, lower alkylsulfinylphenyl, lower alkylsulfonylphenyl, lower alkylmercapto-halophenyl, lower alkylsulfinyl-halophenyl, and lower alkylsulfonyl-halophenyl, and (b) 2-(HO—) - 4 - (Z—NH—) - 6 - (H—)-1,3,5-triazines, where Z is a member of the group consisting of hydrogen, alkyl, aryl, and heteryl.

The 2-($H_2N$—)-4-(Y—NH—)-6-(H—)-1,3,5-triazines of our invention are represented in free base form by the structural formula

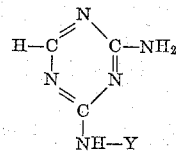

where Y has the meaning indicated above, or by the equivalent structural formula

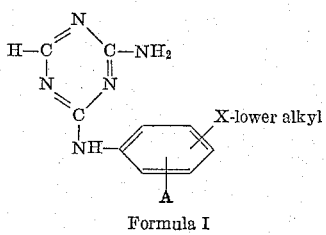

Formula I where A is a member of the group consisting of hydrogen and halogen, and X is a member of the group consisting of —S—, —SO—, and —$SO_2$—. Preferably, lower alkyl contains about 1-6 carbon atoms and includes, for example, methyl, ethyl, propyl, isopropyl, isobutyl, n-hexyl, and the like. These free bases of Formula I react with organic and inorganic acids to form acid-addition salts which are the full equivalents of the free bases. The free bases and many of the acid-addition salts have a low water-solubility. Generally speaking, the acid-addition salts with citric acid and with methanesulfonic acid are considerably more soluble in water than are hydrochlorides.

Our 2-($H_2N$—)-4-(Y—NH—)-6-(H—)-1,3,5-triazines are conveniently prepared, in accordance with this invention, by heating formic acid with the free base form of a 1-(Y—)biguanide, said free bases having the formula Y—NH—C(=NH)—NH—C(=NH)—$NH_2$. This reaction is readily carried out, for example, by heating a mixture of the reactants, conveniently at reflux temperature, until the reaction is complete, ordinarily about one to three hours being sufficient for this purpose. The desired reaction product, which is substantially insoluble in water, is readily isolated and, if desired, purified by conventional manipulative techniques.

Ordinarily, instead of employing one molecular equivalent of each of the two reactants, we prefer to use an excess of the formic acid so that this compound can serve also as a convenient reaction medium.

The free base forms of the 1-(Y—)biguanides employed as starting materials in the above process for the preparation of the 2-($H_2N$—)-4-(Y—NH—)-6-(H—)-1,3,5-triazines are conviently obtained by heating together approximately equimolecular amounts of the appropriate arylamine hydrochloride, Y—$NH_2$.HCl, and dicyanodiamide in water, and converting the resulting hydrochloride form of the 1-(Y—)biguanide to the free base by treatment with alkali. Instead of using the preformed arylamine hydrochloride, the arylamine itself and an equivalent amount of hydrogen chloride (as hydrochloric acid) can be employed.

Our 1-(Y—)biguanides are the free bases having the formula Y—NH—C(=NH)—NH—C(=NH)—$NH_2$ and the acid-addition salts thereof, which are the full equivalents of said free bases. The salts are readily obtained by additively interacting the bases with organic and inorganic acids. These compounds include many members which have utility not only as starting materials, as above-indicated, but also as antiinfective agents. For instance, some of these compounds show bactericidal and bacteriostatic activity at dilutions of about 1–10,000 to 1–400,000 when tested in vitro against Staphylococcus aureus, 209, Eberthela typhi, Hopkins; Pseudomonas aeruginosa; Clostridium welchii, M; and Mycobacterium tuberculosis, H37Rv.; some of them have antiamebal activity; and some of them show activity in vitro and in vivo against viruses, for example, feline pneumonitis, meningopneumonitis, and Sendai (parainfluenza). 1-(4-ethylmercaptophenyl)biguanide and its acid-addition salts showed high activity against Sendai virus in vitro and in mice.

The new 2-(HO—)-4-(Z—NH—)-6-(H—)-1,3,5-triazines of this invention are represented in free acid form by the structural formula

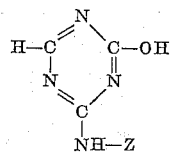

Formula II where Z is a member of the group consisting of: hydrogen; alkyl, for example methyl, ethyl, n-propyl, isopropyl, n-hexyl, n-dodecyl, and the like; aryl, for example monocyclic and bicyclic aryl such as phenyl, lower alkylphenyl, halophenyl, lower alkoxyphenyl, lower alkylmercaptophenyl, lower alkylsulfinylphenyl, lower alkylsulfonylphenyl, acetylphenyl, sulfamylphenyl, nitrophenyl, cyanophenyl, lower alkanoylaminophenyl, biphenyl, naphthyl and the like; and heteryl, for example pyridyl, thiazolyl, quinolyl, pyrimidyl, and the like. Generally speaking, the solubility of the free acid forms of Formula II in water is very low. The acid forms react with organic and inorganic bases to form salts which are the full equivalents of the acids. Many of the salt forms of our 2-(HO—)-4-(Z—NH—)-6-(H—)-1,3,5-triazines are considerably more soluble in water than the corresponding acids. Our new 2-(HO—)-4-(Z—NH—)-6-(H—)-1,3,5-triazines are thus the free acids represented by Formula II and the organic and inorganic salts of said free acids.

The new 2-(HO—)-4-(Z—NH—)-6-(H—)-1,3,5-triazines are conveniently obtained, in accordance with our invention, by heating the corresponding 2-chloro-4-(Z—NH—)-6-(H—)-1,3,5-triazines with glacial acetic acid. Advantageously, an excess of the glacial acetic acid is employed as a reaction medium and the reaction mixture is refluxed for about one to two hours. The 2-chloro-4-(Z—NH—)-6-(H—)-1,3,5-triazines employed as starting materials for this reaction are readily prepared by aminating 2,4-dichloro-1,3,5-triazine with approximately one molecular equivalent of an appropriate aminating agent, Z—NH$_2$, at a low temperature, for instance about 0–10° C.

The novel 2-(H$_2$N—)-4-(Y—NH—)-6-(H—)-1,3,5-triazines and 2-(HO—)-4-(Z—NH—)-6-(H—)-1,3,5-triazines of this invention produce diuresis and chloruresis, and they are useful as diuretic agents. Moreover, some of the 2-(H$_2$N—)-4-(Y—NH—)-6-(H—)-1,3,5-triazines have useful antibacterial and antifungal activity.

Our invention is illustrated by the following examples without, however, being limited thereto.

EXAMPLE 1

*2-Amino-4-(4-Methylmercaptophenylamino)-1,3,5-Triazine*

A mixture of 68 g. of 1-(4-methylmercaptophenyl)-biguanide and 600 ml. of 90 percent formic acid was refluxed for three hours. The olive-green reaction mixture was filtered to remove a small amount of solid, and the filtrate was evaporated under reduced pressure to a volume of about 300 ml. This concentrated solution, which had a brown color, was poured into 1050 ml. of cold water. The mixture, which contained light pink solid which had separated from solution, was stirred and cooled for thirty minutes and then filtered. The solid thus collected was washed and dried. The product thereby obtained, which weighed 59.5 g., was dissolved in 250 ml. of boiling dioxane, decolorizing charcoal was added, and the mixture was filtered while hot. The red filtrate was stirred and chilled, 100 ml. of dioxane was added, and after again chilling the mixture it was filtered to collect the solid which had separated from solution. The collected solid was sucked partially dry on the filter and was then removed and stirred with 75 ml. of cold dioxane. The mixture was filtered, and the collected solid was washed with diethyl ether and dried. The solid thus obtained weighed 39 g. and melted at 207–210° C. A 37 g. portion of this product was dissolved in 225 ml. of boiling dioxane, decolorizing charcoal was added and the mixture was filtered while hot. The filtrate was allowed to cool slowly to room temperature (about 25° C.). The precipitate which had separated from solution was collected on a filter, washed wtih cold dioxane and with diethyl ether, then stirred with petroleum ether, and re-collected on a filter. There was thus obtained 21.5 g. of white solid which melted at 210–211° C. This product was 2-amino-4-(4-methylmercaptophenylamino)-1,3,5-triazine (Formula I: A=H; lower alkyl-X—=4-(CH$_3$—S—), having the molecular formula C$_{10}$H$_{11}$N$_5$S.

The solubility of this base in each of water, hydrochloric acid, and 95 percent ethyl alcohol at 25° C. was less than 0.25 percent. In 25 percent aqueous citric acid solution at 25° C., the base was soluble up to 4 percent; and in 10 percent aqueous citric acid solution, its solubility was less than 1 percent.

In dogs, the compound had a diuretic activity greater than that of theophylline in comparisons at dosage levels of 7.5, 15, 30, and 60 mg./kg. In mice, the oral LD$_{50}$ of 2-amino-4-(4-methylmercaptophenylamino)-1,3,5-triazine in mice was 1360±290 mg./kg. (twenty-four hour test) and 540±137 mg./kg. (seven day test); and the intragastric approximatel LD$_{50}$ was 310 mg./kg. At dilutions as high as about 1 to 100,000–120,00, 2-amino-4-(4-methylmercaptophenylamino)1-3,5-triazine had bacteriostatic and bactericidal activity in vitro against *Staphylococcus aureus*, 209; *Streptococcus hemolyticus*, C203; *Eberthella typhi*, Hopkins; *Clostridium welchii*, M; and *Mycobacterium tuberculosis*, H37Rv. It had fungistatic and fungicidal activity against *Trichophyton interdigitale*, *Trichophyton mentagrophytes*, and *Trichophyton gypseum*.

EXAMPLE 2

*2-Amino-4-(4-Ethylmercaptophenylamino)-1,3,5-Triazine*

Using a procedure similar to that described in Example 1, 92 g. of 1-(4-ethylmercaptophenyl)biguanide and 795 ml. of 90 percent formic acid were interacted to yield as a product 55.3 g. of a tan powder which melted at 170–173° C. This solid was recrystallized from 920 ml. of anhydrous ethyl alcohol, with charcoaling, to obtain 36 g. of solid which melted at 175–177° C. This product was 2-amino-4-(4-ethylmercaptophenylamino) - 1,3,5-triazine (Formula I: A=H;

lower alkyl-X—=4-(C$_2$H$_5$—S—)

having the molecular formula C$_{11}$H$_{13}$N$_5$S. The solubility of this base in each of water and 1 N hydrochloric acid at 25° C. was less than 0.25 percent; its solubility in 95 percent ethyl alcohol was less than 1 percent.

In diuretic tests in dogs the diuresis caused by 2-amino-4-(4-ethylmercaptophenylamino)-1,3-5-triazine was greater than that caused by theophylline at comparative doses of 7.5, 15, and 30 mg./kg., and less than that caused by theophylline at comparative doses of 60 mg./kg.; and the chloruresis caused by 2-amino-4-(4-ethylmercaptophenylamino)-1,3,5-triazine was greater than that caused by theophyline at comparative doses of 7.5 and 15 mg./kg., and less than that caused by theophylline at comparative doses of 30 and 60 mg./kg. In mice, the peroral LD$_{50}$ of 2-amino-4-(4-ethylmercaptophenylamino) -1,3,5 - triazine was greater than 2000 mg./kg. (twenty-four hour test), 2000±970 mg./kg. (seven day test), and 1680±740 mg./kg. (fourteen day test). Oral administration of 2-amino-4-(4-ethylmercaptophenylamino) - 1,3,5-triazine to dogs in doses of 30 mg./kg./day for eighteen days did not produce any kidney damage in the dogs.

EXAMPLE 3

*2-Amino-4-(4-n-Propylmercaptophenylamino)-1,3,5-Triazine*

Using a procedure similar to that described in Example 1, 50 g. of 1-(4-n-propylmercaptophenyl)biguanide and 430 ml. of 90 percent formic acid were interacted to yield 37.4 g. of solid product which melted at 153–158° C. This solid was recrystallized from 370 ml. of isopropyl alcohol, with charcoaling, and the product was washed with 50 ml. of diethyl ether. There was thus obtained 10.5 g. of off-white powder which melted at 157–158° C. This product was 2-amino-4-(4-n-propylmercaptophenylamino)-1,3,5-triazine (Formula I: A=H;

lower alkyl-X—=4-(CH$_3$CH$_2$CH$_2$—S—)

having the molecular formula C$_{12}$H$_{15}$N$_5$S. This base was soluble in a mixture of 0.76 ml. 0.5 N hydrochloric acid and 0.24 ml. of water at 25° C. to the extent of about 5 percent; on standing, a solid precipitated from the 5 percent solution. The solubility of the base in ethyl alcohol at 25° C. was less than 1 percent.

In mice, the oral LD$_{50}$ of 2-amino-4-(4-n-propylmercaptophenylamino) - 1,3,5 - triazine was >4000 mg./kg. (twenty-four hour test), 3835 mg./kg. (seven day test), and 3340 mg./kg. (fourteen day test).

EXAMPLE 4

*2-Amino-4-(4-n-Butylmercaptophenylamino)-1,3,5-Triazine*

Using a procedure similar to that described in Example 1, 94 g. of 1-(4-n-butylmercaptophenyl)biguanide was interacted with 215 ml. of 90 percent formic acid to yield 71 g. of solid product which melted at 155–164° C. This solid was recrystallized from 1380 ml. of isopropyl alcohol, with charcoaling, to obtain 54 g. of solid which was then recrystallized from 1100 ml. of isopropyl alcohol, with charcoaling. There was thus obtained 42 g. of white powder which melted at 161–162° C. This product was 2-amino-4-(4-n-butylmercaptophenylamino)-1,3,5-triazine (Formula I: A=H; lower alkyl-X—=4-(CH$_3$CH$_2$CH$_2$CH$_2$—S—), having the molecular formula C$_{13}$H$_{17}$N$_5$S. The solubility of this base in water at 25° C. was less than 0.25 percent, and its solubility in ethyl alcohol at 25° C. was less than 1 percent.

In mice, the oral approximate LD$_{50}$ of 2-amino-4-(4-n-butylmercaptophenylamino)-1,3,5-triazine was greater than 4000 mg./kg. (twenty-four hour test and seven day test), and was 3000 mg./kg. (fourteen day test). This compound had bacteriostatic activity in vitro against *Staphylococcus aureus*, 209, and against *Eberthella typhi*, Hopkins, at dilutions as high as 1 to 10,000.

EXAMPLE 5

*2-Amino-4-(4-Methylsulfonylphenylamino)-1,3,5-Triazine*

A mixture of 42.0 g. of 1-(4-methylsulfonylphenyl)-biguanide and 465 ml. of 90 percent formic acid was refluxed for three hours. The resulting turbid, colorless reaction mixture was filtered and the filtrate was concentrated by evaporation to a volume of 230 ml. The concentrated solution was added to 465 ml. of cold water, and the mixture was chilled to 0° C. with occasional stirring. The white solid which separated from solution was collected on a filter, washed well with cold water, and sucked partially dry on the filter. To remove traces of formic acid, the product was mixed with 500 ml. of 5 percent aqueous sodium bicarbonate solution, and the mixture was filtered. The collected solid was washed well with water and dried in an oven at 70° C. to yield 19.0 g. of solid which melted at 243–246° C. This product was 2-amino-4-(4-methylsulfonylphenylamino)-1,3,5-triazine (Formula I: A=H; lower alkyl-X—=4-(CH$_3$—SO$_2$—), having the molecular formula

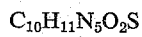

$$C_{10}H_{11}N_5O_2S$$

In each of water and hydrochloric acid at 25° C. the solubility of this base was less than 0.25 percent; in each of 10 percent aqueous citric acid solution and 5 percent aqueous methanesulfonic acid solution, it was soluble to the extent of about 1 percent; and in 95 percent ethyl alcohol, its solubility was less than 1 percent.

In dogs, the diuretic activity of 2-amino-4-(4-methylsulfonylphenylamino)-1,3,5-triazine was greater than that of theophylline at comparative doses of 7.5, 15, 30, and 60 mg./kg. In mice, the oral approximate LD$_{50}$ of 2-amino-4-(4-methylsulfonylphenylamino)-1,3,5-triazine was 350 mg./kg. (twenty-four hour test) and 309 mg./kg. (seven day test).

EXAMPLE 6

*2-Amino-4-(4-Methylsulfinylphenylamino)-1,3,5-Triazine*

Using a procedure similar to that described in Example 1, but substituting 73 g. of 1-(4-methylsulfinylphenyl)-biguanide for the 1-(4-methylmercaptophenyl)biguanide, there is obtained as the reaction product 2-amino-4-(4-methylsulfinylphenylamino)-1,3,5-triazine (Formula I: A=H; lower alkyl-X—=4-(CH$_3$—SO—), having the molecular formula C$_{10}$H$_{11}$N$_5$SO.

When the procedures of Examples 1–6 above are followed, but substituting for the respective 1-(4-lower alkyl-X—C$_6$H$_4$—)biguanides the position isomers thereof, namely the 1-(3-lower alkyl-X—C$_6$H$_4$—)biguanides and the 1-(2-lower alkyl-X—C$_6$H$_4$—)biguanides, the reaction products obtained are the corresponding position isomers wherein the lower alkyl-X-substituent is in the 3- or 2-positions, respectively, viz.: 2-amino-4-(3-methylmercaptophenylamino)-1,3,5-triazine and 2-amino-4-(2-methylmercaptophenylamino)-1,3,5-triazine, following the procedure of Example 1; 2-amino-4-(3-ethylmercaptophenylamino)-1,3,5-triazine and 2-amino-4-(2-ethylmercaptophenylamino)-1,3,5-triazine, following the procedure of Example 2; 2-amino-4-(3-n-propylmercaptophenylamino)-1,3,5-triazine and 2-amino-4-(2-n-propylmercaptophenylamino)-1,3,5-triazine, following the procedure of Example 3; 2-amino-4-(3-n-butylmercaptophenylamino)-1,3,5-triazine and 2-amino-4-(2-n-butylmercaptophenylamino)-1,3,5-triazine, following the procedure of Example 4; 2-amino-4-(3-methylsulfonylphenylamino)-1,3,5-triazine and 2-amino-4-(2-methylsulfonylphenylamino)-1,3,5-triazine, following the procedure of Example 5; and 2-amino-4-(3-methylsulfinylphenylamino)-1,3,5-triazine and 2-amino-4-(2-methylsulfinylphenylamino)-1,3,5-triazine, following the procedure of Example 6.

Following the procedures of Examples 1–6 above but employing, instead of the respective 1-(4-lower alkyl-X—C$_6$H$_4$—)biguanide reactants, the molecularly equivalent amount of a 1-[lower alkyl-X-(halophenyl)]biguanide, the reaction product in each instance is the corresponding 2-amino-4-(lower alkyl-X-halophenylamino)-1,3,5-triazine. Thus, for example, following the procedure of Example 1, but employing 78.5 g. of 1-(4-methylmercapto-3-chlorophenyl)biguanide, the product obtained is 2-amino-4-(4-methylmercapto-3-chlorophenylamino)-1,3,5-triazine; following the procedure of Example 1, but employing 107 g. of 1-(2-methylmercapto-4-iodophenyl)biguanide, the product obtained is 2-amino-4-(2-methylmercapto-4-iodophenylamino)-1,3,5-triazine; following the procedure of Example 2, but employing 106 g. of 1-(4-ethylmercapto-2-chlorophenyl)biguanide, the product obtained is 2-amino-4-(4-ethylmercapto-2-chlorophenylamino)-1,3,5-triazine; following the procedure of Example 2, but employing 99.5 g. of 1-(5-ethylmercapto-3-fluorophenyl)biguanide, the product obtained is 2-amino-4-(5-ethylmercapto-3-fluorophenylamino)-1,3,5-triazine; following the procedure of Example 3, but employing 66 g. of 1-(2-n-propylmercapto-2-bromophenyl)biguanide, the product obtained is 2-amino-4-(2-n-propylmercapto-2-bromophenylamino)-1,3,5-triazine; following the procedure of Example 4, but employing 106 g. of 1-(4-n-butylmercapto-3-chlorophenyl)biguanide, the product obtained is 2-amino-4-(4-n-butylmercapto-3-chlorophenylamino)-1,3,5-triazine; following the procedure of Example 5, but employing 47.5 g. of 1-(4-methylsulfonyl-3-chlorophenyl)biguanide, the product obtained is 2-amino-4-(4-methylsulfonyl-3-chlorophenylamino)-1,3,5-triazine; following the procedure of Example 5, but employing 57.5 g. of 1-(3-ethylsulfonyl-4-bromophenyl)biguanide, the product obtained is 2-amino-4-(3-ethylsulfonyl-4-bromophenylamino)-1,3,5-triazine; following the procedure of Example 1, but employing 83.5 g. of 1-(4-methylsulfinyl-3-chlorophenyl)biguanide, the product obtained is 2-amino-4-(4-methylsulfinyl-3-chlorophenylamino)-1,3,5-triazine; and following the procedure of Example 2, but employing 129 g. of 1-(4-ethylsulfinyl-2-chlorophenyl)biguanide, the product obtained is 2-amino-4-(4-ethylsulfinyl-2-chlorophenylamino)-1,3,5-triazine.

EXAMPLE 7

*2-(HO—)-4-(Z—NH—)-1,3,5-Triazines*

To a solution of 15 g. of 2,4-dichloro-1,3,5-triazine in 40 ml. of acetone there is added a mixture of 40 ml. of cold water and 20 g. of ice. While vigorously stirring the resulting finely dispersed suspension of 2,4-dichloro-1,3,5-triazine, 0.1 mole of the aminating agent, Z—NH$_2$, is slowly added (in the case of arylamines, conveniently as a solution in dioxane) while keeping the temperature of the reaction mixture at 0–5° C. by means of an ice bath. After addition of the aminating agent is completed, a solution of 4 g. of sodium hydroxide in 8 ml. of water is added, and the reaction mixture is stirred for one hour. The reaction mixture is then filtered. The solid thus collected is washed with water and dried. This product is a 2-chloro-4-(Z—NH—)-1,3,5-triazine.

The chloro group in the 2-chloro-4-(Z—NH—)-1,3, 5-triazine is hydrolyzed off as follows: The product of the amination reaction above is placed in 75 ml. of glacial acetic acid, and the mixture is refluxed for two hours. Most of the excess acetic acid is then removed from the mixture by evaporation under reduced pressure, and after adding water to the residue thus obtained, the mixture is filtered. The solid thus obtained is the desired 2-hydroxy-4-(Z—NH—)-1,3,5-triazine (Formula II).

Proceeding in the above-described manner, and employing as the aminating agent 12.7 g. (0.1 mole) of 4-chloroaniline, dissolved in 30 ml. of dioxane, the amination product is 2-chloro-4-(4-chlorophenylamino)-1,3,5-triazine, and the hydrolysis product obtained therefrom is 2-hydroxy-4-(4-chlorophenylamino)-1,3,5-triazine (Formula II: Z=4—Cl—$C_6H_4$—), having the molecular formula $C_9H_7ClN_4O$ and melting at 295–297° C. with decomposition.

The solubility of 2-hydroxy-4-(4-chlorophenylamino)-1,3,5-triazine in water at 25° C. is less than 0.25 percent and its solubility in ethyl alcohol is less than 1 percent. In diuretic tests in dogs, the diuresis caused by this compound was approximately equal to, and the chloruresis less than, the respective diuresis and chloruresis caused by theophylline when the two compounds were compared at a dosage level of 30 mg./kg. In mice, the oral approximate $LD_{50}$ of 2-hydroxy-4-(4-chlorophenylamino)-1,3,5-triazine was greater than 4000 mg./kg. (twenty-four hour test) and was 500 mg./kg. (fourteen day test).

In similar fashion, by using the below-indicated aminating agents, Z—$NH_2$, in the above-described general procedure, there are obtained the following respective amination and hydrolysis products:

(a) amination with ammonia yields 2-chloro-4-amino-1,3,5-triazine, which is hydrolyzed to produce 2-hydroxy-4-amino-1,3,5-triazine (Formula II: Z=hydrogen);

(b) amination with n-hexylamine yields 2-chloro-4-n-hexylamino-1,3,5-triazine, which is hydrolyzed to produce 2-hydroxy-4-n-hexylamino-1,3,5-triazine (Formula II: Z=n-hexyl);

(c) amination with aniline yields 2-chloro-4-(phenylamino)-1,3,5-triazine, which is hydrolyzed to produce 2-hydroxy-4-(phenylamino)-1,3,5-triazine (Formula II: Z=$C_6H_5$—);

(d) amination with 3-methylaniline yields 2-chloro-4-(3-methylphenylamino)-1,3,5-triazine, which is hydrolyzed to yield 2-hydroxy-4-(3-methylphenylamino)-1,3,5-triazine (Formula II: Z=3-($CH_3$)—$C_6H_4$—);

(e) amination with 2-ethoxyaniline yields 2-chloro-4-(2-ethoxyphenylamino)-1,3,5-triazine, which is hydrolyzed to yield 2-hydroxy-4-(2-ethoxyphenylamino)-1,3,5-triazine (Formula II: Z=2-($C_2H_5$—O)—$C_6H_4$—);

(f) amination with 4-methylmercaptoaniline yields 2-chloro-4-(4-methylmercaptophenylamino)-1,3,5-triazine, which is hydrolyzed to produce 2-hydroxy-4-(4-methylmercaptophenylamino)-1,3,5-triazine (Formula II:

Z=4-($CH_3$—S)—$C_6H_4$—)

(g) amination with 2-ethylsulfinylaniline yields 2-chloro-4-(2-ethylsulfinylphenylamino)-1,3,5-triazine, which is hydrolyzed to produce 2-hydroxy-4-(2-ethylsulfinylphenylamino)-1,3,5-triazine (Formula II:

Z=2-($C_2H_5$—SO—)—$C_6H_4$—)

(h) amination with 3-propylsulfonylaniline yields 2-chloro-4-(3-propylsulfonylphenylamino)-1,3,5-triazine, which is hydrolyzed to produce 2-hydroxy-4-(3-propylsulfonylphenylamino)-1,3,5-triazine (Formula II: Z=3-($CH_3CH_2CH_2$—$SO_2$—)—$C_6H_4$—);

(i) amination with 4-acetaniline yields 2-chloro-4-(4-acetylphenylamino)-1,3,5-triazine, which is hydrolyzed to yield 2-hydroxy-4-(4-acetylphenylamino)-1,3,5-triazine (Formula II: Z=4-($CH_3$—CO—)—$C_6H_4$—);

(j) amination with 4-sulfamylaniline (sulfanilamide) yields 2-chloro-4-(4-sulfamylphenylamino)-1,3,5-triazine, which is hydrolyzed to produce 2-hydroxy-4-(4-sulfamylphenylamino)-1,3,5-triazine (Formula II:

Z=4-($H_2N$—$SO_2$—)—$C_6H_4$—)

(k) amination with 3-nitroaniline yields 2-chloro-4-(3-nitrophenylamino)-1,3,5-triazine, which is hydrolyzed to yield 2-hydroxy-4-(3-nitrophenylamino)-1,3,5-triazine (Formula II: Z=3-($O_2N$—)—$C_6H_4$—);

(l) amination with 4-cyanoaniline yields 2-chloro-4-(4-cyanophenylamino)-1,3,5-triazine, which is hydrolyzed to produce, as desired, either 2-hydroxy-4-(4-cyanophenylamino)-1,3,5-triazine (Formula II:

Z=(NC—)—$C_6H_4$—)

or 2-hydroxy-4-(4-carboxyphenylamino)-1,3,5-triazine (Formula II: Z=4—(HOOC—)—$C_6H_4$—);

(m) amination with 4-(acetylamino)aniline yields 2-chloro-4-[4-(acetylamino)phenylamino]-1,3,5-triazine, which is hydrolyzed to yield 2-hydroxy-4-[4-(acetylamino)phenylamino]-1,3,5-triazine (Formula II:

Z=4—($CH_3$—CO—NH—)—$C_6H_4$—)

(n) amination with 4-phenylaniline (4-aminobiphenyl) yields 2-chloro-4-(4-biphenylamino)-1,3,5-triazine, which is hydrolyzed to yield 2-hydroxy-4-(4-biphenylamino)-1,3,5-triazine (Formula II: Z=4—($C_6H_5$—)—$C_6H_4$—);

(o) amination with 1-aminonaphthalene yields 2-chloro-4-(1-naphthylamino)-1,3,5-triazine, which is hydrolyzed to yield 2-hydroxy-4-(1-naphthylamino)-1,3,5-triazine (Formula II: Z=1—$C_{10}H_7$—);

(p) amination with 4-aminopyridine yields 2-chloro-4-(4-pyridylamino)-1,3,5-triazine, which is hydrolyzed to produce 2-hydroxy-4-(4-pyridylamino)-1,3,5-triazine (Formula II: Z=4—$C_5H_4N$—);

(q) amination with 2-aminothiazole yields 2-chloro-4-(2-thiazolylamino)-1,3,5-triazine, which is hydrolyzed to produce 2-hydroxy-4-(2-thiazolylamino)-1,3,5-triazine (Formula II: Z=2—($C_3H_2NS$—);

(r) amination with 4-aminoquinoline yields 2-chloro-4-(4-quinolylamino)-1,3,5-triazine, which is hydrolyzed to produce 2-hydroxy-4-(4-quinolylamino)-1,3,5-triazine (Formula II: Z=4—$C_9H_6N$—); and (s) amination with 2-aminopyrimidine yields 2-chloro-4-(2-pyrimidylamino)-1,3,5-triazine, which is hydrolyzed to produce 2-hydroxy-4-(2-pyrimidylamino)-1,3,5-triazine (Formula II: Z=2—$C_4H_3N_2$—).

EXAMPLE 8

*1-(Y—)Biguanides*

The 1-(Y—)biguanides of our invention were prepared by the following general procedure:

To 300 ml. of water, heated to reflux temperature in a one-liter 3-neck flask fitted with a stirrer and reflux condenser, there was added 0.5 mole of the desired arylamine hydrochloride, Y—$NH_2$·HCl or, alternatively, 0.5 mole of the free arylamine, Y—$NH_2$, and 0.5 mole of hydrogen chloride (as hydrochloric acid). To the solution thus obtained there was gradually added 42 g. (0.5 mole) of dicyanodiamide. The resulting reaction mixture was refluxed for about one hour and was then chilled. The solid which separated from solution was collected on a filter, washed with water, and dried. This product was the 1-(aryl)biguanide hydrochloride,

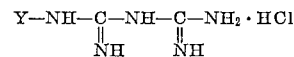

These hydrochlorides obtained in this manner were of sufficient purity for use as chemical intermediates but, when desired, they were recrystallized from a suitable solvent, such as isopropyl alcohol, to obtain the pure salt. For use in the preparation of our 2-($H_2N$—)-4-(Y—NH—)-6-(H—)-1,3,5-triazines, the hydrochlorides obtained as above-described were converted to the corresponding free bases as follows: The hydrochloride was dissolved in the minimum quantity of boiling water and an excess (1 to 2.5 moles) of sodium hydroxide (as a 35 percent aqueous sodium hydroxide solution) was added to the hot solution. The alkaline solution was chilled and the solid which separated from solution was collected on a filter, washed with water, and dried. This product, the free base of formula

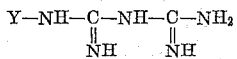

was ordinarily employed as a starting material without any further purification. However, when desired, the free base was purified by conventional recrystallization means.

The following illustrative hydrochlorides were prepared by the foregoing procedure, and each hydrochloride was converted to the corresponding free base:

1-(4-methylmercaptophenyl)biguanide hydrochloride, M.P. 221–223° C.
1-(4-ethylmercaptophenyl)biguanide hydrochloride, M.P. 204–206° C.
1-(4-n-propylmercaptophenyl)biguanide hydrochloride, M.P. 196–197° C.
1-(4-isopropylmercaptophenyl)biguanide hydrochloride, M.P. 204–205° C.
1-(4-n-butylmercaptophenyl)biguanide hydrochloride, M.P. 192–195° C.
1-(4-n-amylmercaptophenyl)biguanide hydrochloride, M.P. 187–191° C.
1-(4-methylmercapto-3-chlorophenyl)biguanide hydrochloride, M.P. 190–192° C.
1-(4-ethylmercapto-3-chlorophenyl)biguanide hydrochloride, M.P. 191–192° C.
1-(4-n-propylmercapto-3-chlorophenyl)biguanide hydrochloride, M.P. 179–180° C.
1-(4-isopropylmercapto-3-chlorophenyl)biguanide hydrochloride, M.P. 196–197° C.
1-(4-n-butylmercapto-3-chlorophenyl)biguanide hydrochloride, M.P. 183–185° C.
1-(4-n-amylmercapto-3-chlorophenyl)biguanide hydrochloride, M.P. 192–193° C.
1-(4-n-hexylmercapto-3-chlorophenyl)biguanide hydrochloride, M.P. 116–118° C.
1-(4-n-heptylmercapto-3-chlorophenyl)biguanide hydrochloride, M.P. 120–124° C.
1-(4-methylsulfonylphenyl)biguanide hydrochloride, M.P. 226–228° C.

This application is a division of our copending application, Serial No. 14,551, filed March 14, 1960.

We claim:
1. 1-(Y—)biguanide, wherein Y is lower alkylmercapto-chlorophenyl.
2. 1-(4-lower alkylmercapto-3-chlorophenyl)biguanide.
3. 1-(Y—)biguanide, wherein Y is 4-methylmercapto-3-chlorophenyl.
4. 1-(Y—)biguanide, wherein Y is 4-ethylmercapto-3-chlorophenyl.
5. 1-(Y—)biguanide, wherein Y is 4-n-propylmercapto-3-chlorophenyl.
6. 1-(Y—)biguanide, wherein Y is 4-isopropylmercapto-3-chlorophenyl.
7. 1-(Y—)biguanide, wherein Y is 4-n-butylmercapto-3-chlorophenyl.
8. 1-(Y—)biguanide, wherein Y is 4-n-amylmercapto-3-chlorophenyl.
9. 1-(Y—)biguanide, wherein Y is 4-n-hexylmercapto-3-chlorophenyl.
10. 1-(Y—)biguanide, wherein Y is 4-n-heptylmercapto-3-chlorophenyl.

References Cited in the file of this patent

UNITED STATES PATENTS

| | | |
|---|---|---|
| 1,822,065 | Spröngerts et al. | Sept. 8, 1931 |
| 2,195,073 | Beretta | Mar. 26, 1940 |
| 2,255,090 | Tinker et al. | Sept. 9, 1941 |
| 2,684,924 | Rose et al. | July 27, 1954 |
| 2,836,539 | Cutler | May 27, 1958 |

FOREIGN PATENTS

| | | |
|---|---|---|
| 599,714 | Great Britain | Mar. 18, 1948 |
| 709,906 | Great Britain | June 2, 1954 |
| 835,986 | France | Oct. 3, 1938 |